(12) United States Patent
McCully

(10) Patent No.: US 7,123,261 B2
(45) Date of Patent: Oct. 17, 2006

(54) COORDINATING GRID TRACKING AND MOJIKUMI SPACING OF JAPANESE TEXT

(75) Inventor: Nathaniel M. McCully, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 179 days.

(21) Appl. No.: 10/390,991

(22) Filed: Mar. 17, 2003

(65) Prior Publication Data

US 2004/0125108 A1 Jul. 1, 2004

Related U.S. Application Data

(63) Continuation-in-part of application No. 10/331,131, filed on Dec. 26, 2002, now abandoned.

(51) Int. Cl.
*G09G 5/32* (2006.01)
*G06T 11/00* (2006.01)

(52) U.S. Cl. ............................. 345/471; 715/518

(58) Field of Classification Search .............. 345/471, 345/472, 472.2, 472.3, 467, 468; 715/518, 715/519
See application file for complete search history.

(56) References Cited

U.S. PATENT DOCUMENTS

| | | | |
|---|---|---|---|
| 4,284,975 A | 8/1981 | Odaka | |
| 4,291,381 A | 9/1981 | Siebeck | |
| 4,591,999 A | 5/1986 | Logan | |
| 4,608,664 A | 8/1986 | Bartlett et al. | |
| 4,833,627 A | 5/1989 | Leszczynski | |
| 5,018,083 A | 5/1991 | Wantanabe et al. | |
| 5,175,806 A | 12/1992 | Muskovitz et al. | |
| 5,287,443 A | 2/1994 | Mameda et al. | |
| 5,399,029 A | 3/1995 | Muraoka et al. | |
| 5,416,898 A * | 5/1995 | Opstad et al. | 345/468 |
| 5,432,890 A | 7/1995 | Watanabe | |
| 5,500,931 A | 3/1996 | Sonnenschein | |
| 5,501,538 A | 3/1996 | Sawada et al. | |
| 5,548,700 A | 8/1996 | Bagley et al. | |
| 5,579,471 A | 11/1996 | Barber et al. | |
| 5,581,670 A | 12/1996 | Bier et al. | |
| 5,617,115 A | 4/1997 | Itoh et al. | |
| 5,684,510 A * | 11/1997 | Brassell et al. | 345/468 |
| 5,724,072 A * | 3/1998 | Freeman et al. | 345/648 |
| 5,724,596 A | 3/1998 | Lathrop | |
| 5,740,456 A | 4/1998 | Harel et al. | |

(Continued)

FOREIGN PATENT DOCUMENTS

JP 61-282974 12/1986

(Continued)

OTHER PUBLICATIONS

U.S. Appl. No. 09/964,293, filed Sep. 25, 2001, Shade et al.

(Continued)

*Primary Examiner*—Jeffery A. Brier
(74) *Attorney, Agent, or Firm*—Fish & Richardson P.C.

(57) ABSTRACT

Methods and apparatus, including computer program products, implementing and using techniques for coordinating grid tracking and character composition. A grid defining a layout of one or more lines of grid boxes is received. Each grid box can accommodate one full-width character and has a global track amount specified in an absolute unit. One or more of the grid boxes is populated with characters and associated spaces. The characters and their associated spaces in the one or more lines of grid boxes are tracked by an amount determined as a function of the global track amount and a proportion of an em for the characters and their associated spaces.

36 Claims, 4 Drawing Sheets

U.S. PATENT DOCUMENTS

| | | | |
|---|---|---|---|
| 5,778,403 A | 7/1998 | Bangs | |
| 5,802,532 A | 9/1998 | Nakayama et al. | |
| 5,803,629 A | 9/1998 | Neville et al. | |
| 5,805,167 A | 9/1998 | Van Cruyningen | |
| 5,809,166 A | 9/1998 | Huang et al. | |
| 5,937,420 A | 8/1999 | Karow et al. | |
| 6,088,520 A | 7/2000 | Taoka et al. | |
| 6,252,607 B1 | 6/2001 | Babcock | |
| 6,321,243 B1 | 11/2001 | Ballard | |
| 6,330,577 B1 | 12/2001 | Kim | |
| 6,359,630 B1 | 3/2002 | Morse et al. | |
| 6,426,751 B1 | 7/2002 | Patel et al. | |
| 6,504,544 B1 | 1/2003 | Hollingsworth et al. | |
| 6,510,441 B1 | 1/2003 | Kenninga | |
| 6,624,814 B1 | 9/2003 | Karow et al. | |
| 6,626,960 B1 | 9/2003 | Gillam | |
| 6,886,133 B1 | 4/2005 | Bailey et al. | |
| 6,928,611 B1 * | 8/2005 | McCully et al. | 715/519 |
| 2001/0048764 A1 | 12/2001 | Betrisey et al. | |
| 2002/0062324 A1 | 5/2002 | McCully et al. | |

FOREIGN PATENT DOCUMENTS

| | | |
|---|---|---|
| JP | 1989-125656 | 5/1989 |
| JP | 1-271275 | 10/1989 |
| JP | 02-213983 | 8/1990 |
| JP | 04-052871 | 2/1992 |
| JP | 04-319764 | 11/1992 |
| JP | 05-224651 | 9/1993 |
| JP | 06-20026 | 1/1994 |
| JP | 06-096174 | 4/1994 |
| JP | 06-149806 | 5/1994 |
| JP | 06-219011 | 8/1994 |
| JP | 07-096594 | 4/1995 |
| JP | 07-149005 | 6/1995 |
| JP | 1995-182303 | 7/1995 |
| JP | 8-137871 | 5/1996 |
| JP | 8-161309 | 6/1996 |
| JP | 08-194832 | 7/1996 |
| JP | 08-314655 | 11/1996 |
| JP | 10-069477 | 3/1998 |
| JP | 1998-222499 | 8/1998 |
| JP | 11-102446 | 4/1999 |
| JP | 11-353491 | 12/1999 |
| JP | 2000-267645 | 9/2000 |
| JP | 2001-281835 | 10/2001 |
| JP | 2001-297077 | 10/2001 |
| JP | 2003-523015 | 7/2003 |

OTHER PUBLICATIONS

Hirschberg, D.S. et al., "New Applications of Failure Functions", *Journal of the Association for Computing Machinery*, vol. 34, No. 3, Jul. 1987, pp. 616-625.

Peter Karow, "Extending Control of Digital Typography", Visible Language, 32.2, Visible Language 1998, pp. 100-127 (671001 IDS Sep. 30, 2004).

* cited by examiner

COORDINATING GRID TRACKING AND MOJIKUMI SPACING OF JAPANESE TEXT

This application is a continuation in part and claims priority to the currently pending U.S. application Ser. No. 10/331,131, filed on Dec. 26, 2002 now abandoned, the specification of which is incorporated herein by reference in its entirety.

BACKGROUND

The present invention relates to coordinating typesetting and layout in desktop publishing (DTP).

DTP documents typically include multiple lines of glyphs, which usually represent characters but can also represent symbols and blank spaces. In a document, the lines of glyphs are arranged vertically, horizontally, or in some combination thereof. This arrangement can be applied to the entire document or any portion of the document. To aid in layout and typesetting, glyphs are usually arranged in a series of virtual bodies, sometimes referred to as emboxes. An embox defines an outer frame around a glyph and has dimensions and size. Generally, the size of an embox is determined by the type size of the character represented by the glyph framed. For example, an embox framing a glyph representing a character of type size ten is smaller than one framing the same glyph representing the character of type size twelve.

In traditional Japanese typesetting, the layout of a document is created on paper with a grid of one-em square boxes in lines, either horizontally or vertically, with space in between the lines to specify a frame of a particular size. A grid of this type is also often referred to as a CJK grid (Chinese-Japanese-Korean grid). In CJK fonts (that is, fonts representing ideographic systems, such as Chinese, Japanese, and Korean) some fonts' glyphs do not fill an embox completely. For example, some Japanese characters, such as punctuation characters, may be only half an em wide while others are a full em wide, and so on.

Tracking is sometimes applied to the CJK Grid, and is expressed in absolute measurement units (such as mm, points, and so on). When such tracking is applied, the escapement (that is, the distance between the glyph's leading edge and its trailing edge) is changed for one or more glyphs. The result of the tracking is a change of visual appearance, giving the impression that spacing has been inserted or deleted between characters in the line of text. In DTP software applications, tracking is typically applied equally to each glyph; this is often referred to as grid tracking. For non-full width glyphs, this means that too much tracking may be applied. Also, Japanese typesetting conventions dictate that tracking be applied only to non-Roman characters, but conventional grid tracking cannot distinguish between Roman and non-Roman characters, and thus Roman characters often appear to be tracked too much.

Furthermore, in Japanese, so-called mojikumi spacing is generally applied, which refers to the adjustment of the width of characters in the text based on their context in a line of characters. Mojikumi aki refers to spacing that is added between two characters in accordance with their type, or spacing that is added before or after the last character of a line. Mojikumi tsume, on the other hand, refers to spacing that is taken off the left or right sides of a character in order to correct for the difference between a standard for full-width punctuation (e.g., JISx4051-1995) and a font definition for full-width punctuation, and in order to prepare for mojikumi aki to be added. In grid tracking, the tracking is typically applied to the glyphs' trailing edges after mojikumi tsume has been subtracted from and mojikumi aki has been added to the glyph's width. Consequently, the glyphs appear to be lopsided and do not present an aesthetically pleasing view to a user.

SUMMARY

In general, in one aspect, this invention provides methods and apparatus, including computer program products, implementing and using techniques for coordinating grid tracking and character composition. A grid defining a layout of one or more lines of grid boxes is received. Each grid box can accommodate one full-width character and has a global track amount specified in an absolute unit. One or more of the grid boxes is populated with characters and associated spaces. The characters and their associated spaces in the one or more lines of grid boxes are tracked by an amount determined for each of the characters or spaces as a function of the global track amount and a proportion of an em for the respective character or space.

Advantageous implementations can include one or more of the following features. Each grid box can be square shaped and have dimensions corresponding to one by one em unit. Tracking can include adjusting the width of the one or more glyphs in the grid to a desired spacing amount; and separately adjusting a width on a trailing edge of each of the one or more glyphs and a space associated with each of the one or more glyphs by a fraction of the global track amount after adjusting the width of the one or more glyphs in the grid to a desired spacing amount. Adjusting the width can include reducing the width of one or more glyphs to match a standard; and adding spacing to increase the width of one or more glyphs based on a context for the one or more glyphs in the one or more lines of characters.

User input specifying the desired spacing amount associated with one or more glyphs based on a context for the one or more glyphs in the one or more lines of characters can be received. Tracking can include setting a global absolute tracking amount for the grid; calculating a proportion of an em width of the glyph's font for one or more glyphs and one or more mojikumi aki spaces; and adjusting the spacing as a function of global absolute tracking amount for the one or more glyphs and one or more mojikumi aki spaces associated with the glyphs based on their respective proportion of an em width of the glyph's font.

Tracking can include setting a global absolute tracking amount for the grid; calculating a proportion of an em width of the glyph's font for one or more glyphs and one or more mojikumi aki spaces; and adjusting the spacing by moving only the glyphs by an amount that includes a tracking amount for a mojikumi aki space. Tracking can include calculating a mojikumi tsume space for a glyph; subtracting the mojikumi tsume space from the glyph's original width to obtain a resulting glyph width; calculating a first proportion corresponding to the resulting glyph width relative to an em unit; calculating a mojikumi aki space for a pair of adjacent characters containing the glyph and an adjacent glyph; calculating a second proportion corresponding to the resulting mojikumi aki space width relative to an em unit; adjusting a position for the glyph in the line of characters by an amount obtained by multiplying the global tracking amount and the second proportion, subtracting the result of the multiplication from the mojikumi aki space; and adjusting the resulting glyph width by an amount obtained by multiplying the global tracking amount and the first proportion.

Tracking can include setting a global absolute tracking amount for the grid, calculating a spacing correction amount as a function of the absolute global tracking amount; and applying the calculated spacing correction amount to one or more characters and their associated spaces. Applying the calculated spacing can include adding the calculated spacing correction amount to both the leading edge and the trailing edge of one or more glyphs representing the characters. Applying the spacing can include deleting the calculated spacing correction amount from both the leading edge and the trailing edge of one or more glyphs representing the characters. Applying the spacing can include adding the calculated spacing correction amount to a mojikumi aki space. Applying the spacing can include deleting the calculated spacing correction amount from a mojikumi aki space. Calculating a spacing correction amount can include for a character, calculating the spacing correction as the global grid tracking amount multiplied by half the ratio of the character glyph width and the grid box width; and for a space, calculating the spacing correction as the global grid tracking amount multiplied by the ratio of the space width and the grid box width Receiving a grid can include receiving a grid defining one or more horizontal lines of characters. Receiving a grid can include receiving a grid defining one or more vertical lines of characters. Receiving a grid can include receiving a Chinese-Japanese-Korean grid. Tracking can be applied to characters in a CJK font, and not to characters in a Roman font.

The invention can be implemented to realize one or more of the following advantages. Tracking in the grid is expressed as an absolute amount for the entire grid. The text, however, is of varying widths in proportion to their emboxes. The actual tracking amount used for each glyph can therefore be an adjusted absolute amount that is proportional to the ratio between the glyph's width and the embox width. Applied mojikumi aki and mojikumi tsume can be used to calculate an actual tracking amount and a position adjustment for individual glyphs, which results in an aesthetically pleasing appearance and provides better legibility. Characters of different widths than one em can be tracked. Mojikumi paragraph indent amounts can be adjusted. The aki spacing can also be adjusted by an absolute amount that is proportional to the ratio between the aki spacing's width and the embox width.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
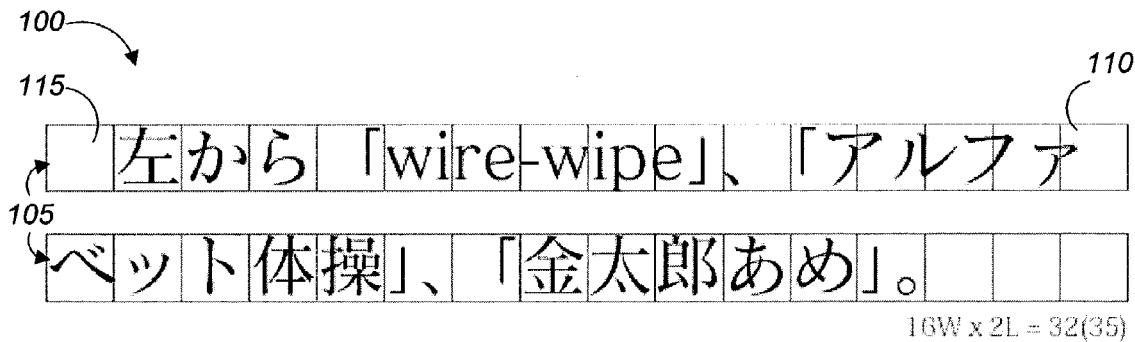
FIG. 1 shows a set of untracked characters arranged in a CJK grid.

FIG. 1 shows a CJK grid of untracked text containing both Japanese and Roman characters. In Japanese typesetting the dimensions for a grid of this type are typically determined by a grid designer, in order to get an aesthetically pleasing layout that has the proper dimensions for a page of a document in which the grid will be used. The primary purpose of the grid is to define where lines of text will be located on a page, but the grid also defines a basic dimension of the text through the grid boxes. After the grid dimensions have been set, the grid is populated with characters that make up the text to be typeset. In the exemplary CJK grid (100) shown in FIG. 1, there are two rows (105), each of which has 16 boxes (110) that are 24 points wide and correspond to one em. The text characters are preceded by a mojikumi paragraph indent (115), which also corresponds one em, and therefore the first grid box on the first line is empty. The first line has three Japanese characters, a open quotation mark (resembling an upside-down "L"), a set of Roman characters spelling out "wire-wipe," a close quotation mark, a comma, another open quotation mark, and four Japanese characters. The second line has five Japanese characters, a close quotation mark, a comma, an open quotation mark, five Japanese characters, a close quotation mark, and a period. The Japanese characters are full-width characters, that is, they have the same width as a grid box, while the punctuation characters are half-width characters, that is, they are only a half grid box wide by default, before any mojikumi aki has been added.

In addition to the characters, there are also mojikumi aki spaces in both the lines. For example, the first line starts with a mojikumi aki indent corresponding to one em, since the user's settings for the shown paragraph dictate that a Kanji character at the beginning of a paragraph should be preceded by a mojikumi paragraph indent. Another rule states that whenever an open quotation mark is preceded by a Japanese Hiragana character (as in the open quotation mark on the first line), a mojikumi aki space corresponding to half an em must be added before the open quotation mark. This can be clearly seen in FIG. 1, where the first open quotation mark is offset by a distance corresponding to half an em inside its grid box. The mojikumi aki space to be added between characters of two classes can either be user-defined or can be based on some standard.

Figure 2:
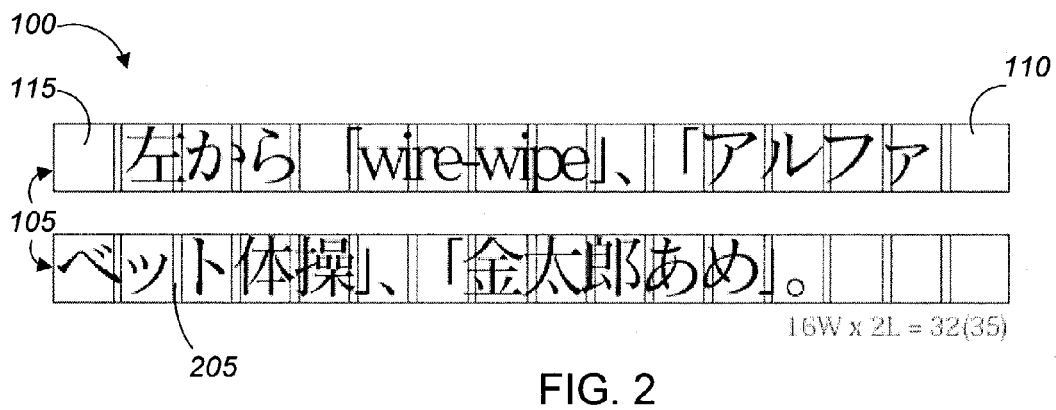
FIG. 2 shows the set of characters of FIG. 1, tracked using standard DTP grid tracking.

In this example, in order to make the text more legible and to give the text a pleasing visual appearance, the grid is set to have each 24-point grid box tracked by −3 points. This results in the text being tracked. FIG. 2 shows an example of what the text of FIG. 1 looks like after tracking has been performed using standard tracking available in DTP applications, namely all glyphs representing text characters are tracked a certain fraction of an em. In the example shown in FIG. 2, all glyphs have been tracked by −125/1000 of an em relative to their immediately preceding glyph (that is, the absolute tracking value of −3 pts for a 24-point grid box has been converted to −125/1000 em relative tracking). The minus sign indicates that the tracking has taken off spacing from the glyphs' escapements, rather than adding spacing, so the visual appearance is that the spacing between characters in each line has been compressed by this amount. As can be seen in FIG. 2, the length of the two lines (105) is shorter than the length of the lines in FIG. 1, due to the tracking. Since every glyph has been tracked by the same amount, some undesirable effects occur. For example, the Roman characters are too close to each other to give a visually pleasing impression (cf. FIG. 1). Glyphs that are not a full em wide, such as commas and periods, are tracked too much and end up too close to their preceding characters. The mojikumi indent (115) at the beginning of the first line of text has been left untracked, since mojikumi aki spacing is not tracked, and still corresponds to one em, which is also too large. The tracking amount can be seen as the "overlapping areas" (205) in FIG. 2.

The present invention provides a process that can be used to coordinate grid tracking and mojikumi spacing of Japanese text in order to improve the tracking and thereby also the visual appearance of the text. The tracking is improved by considering not only text characters, but also mojikumi aki spacings in the line of text. Furthermore, the glyphs for the characters and the mojikumi aki spacings are considered on an individual basis, and an individual tracking amount is determined for each glyph and each mojikumi aki space. The individual tracking amount depends on the respective glyph's or mojikumi aki spacing's width, so that narrower glyphs and spacings are tracked less than full-width glyphs and spacings. The tracking process will now be explained in further detail with regards to FIG. 3.

Figure 3:
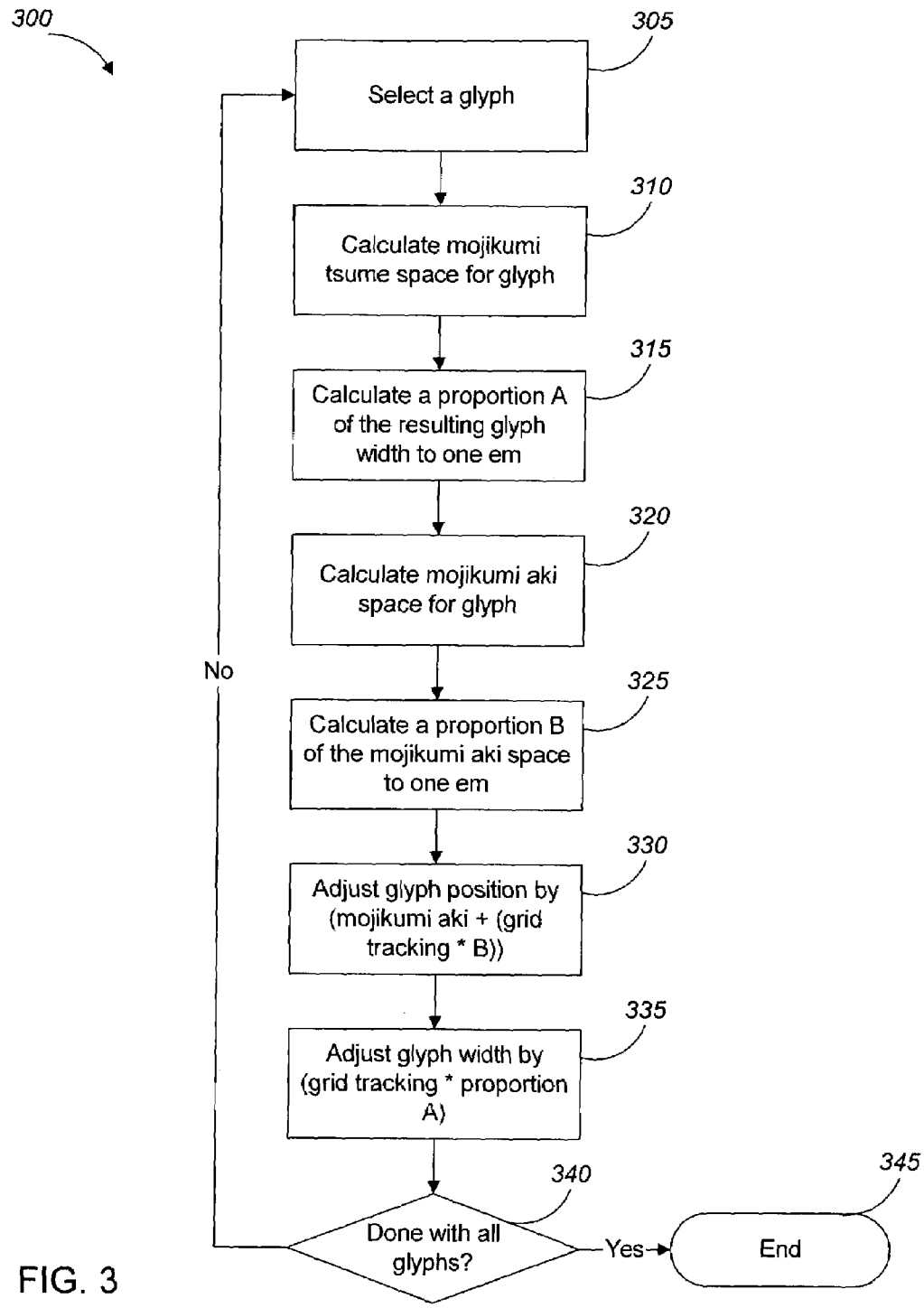
FIG. 3 is a flowchart showing a process for coordinating grid tracking and mojikumi spacing of Japanese text.

As can be seen in FIG. 3, the tracking process 300 starts by selecting a glyph (step 305) and calculating a mojikumi tsume space for the selected glyph (step 310). As was described above, the mojikumi tsume space represents space that is taken off the leading or tailing edge of the glyph in order to reduce the glyphs to a minimum standard width in preparation for mojikumi aki space to be added later. Typically, a space corresponding to −0.5 em is taken off glyphs for punctuation characters, while nothing is taken off non-punctuation character glyphs. The mojikumi tsume space is typically defined in a standard document, such as the JISx4051-1995 standard. Note that the mojikumi tsume space is not taken off the glyph at this point. Instead it is stored to be used later in the process.

Next, a proportion A is calculated that represents the width of the resulting glyph relative to one em (step 315). The width of the glyph for a particular font and font size is stored as a number in the font description, and can thus be obtained from there. The calculated proportion A will be used by the process in a later step (step 335) for adjusting the glyph's width, as will be seen below. After the proportion A has been calculated, a mojikumi aki spacing is determined for the selected glyph (step 320). As was described above, the mojikumi aki space represents space that is added between two characters according to their type, or space that is added before or after a character at the end of a line. Typically, a space corresponding to 0.5 em is added to glyphs for punctuation characters, depending on the punctuation characters' context in the line of text. The mojikumi aki space can either be defined in a standard document, such as the JISx4051-1995 standard, or be determined by a user.

After the mojikumi aki space has been determined, a proportion B is calculated that represents the width of the mojikumi aki space relative to one em (step 325). The process then adjusts the position of the glyph in the line of characters relative to its preceding glyph by an amount that is equal to the determined mojikumi aki amount plus a global grid tracking amount multiplied by the proportion B (step 330). The global tracking amount is typically defined by the grid designer when the grid is created.

When the position of the glyph has been adjusted, the process also adjusts the glyph width by an amount that is equal to the global grid tracking amount multiplied by the proportion A (step 335), that is, the adjustment of the glyph width depends on the initial size of the glyph and is therefore not uniform for all glyphs.

Finally, the process checks whether there are any more glyphs to be tracked (step 340). If there are more glyphs to be tracked, the process returns to step 305 and selects a new glyph. When all glyphs have been tracked, the process ends (step 345). It should be noted that Roman characters are not tracked in the implementation of the invention discussed above since they are considered to already be properly tracked.

In an alternative implementation, instead of treating punctuation glyphs as half-width glyphs and conditionally adding separate mojikumi aki, the punctuation glyphs are treated as full-width glyphs, unaltered from their normal width in the font data. Then, in order to achieve correct positioning of the glyph in the tracked embox, the glyph preceding the punctuation is tracked by an amount equal to the glyph's calculated grid tracking, plus an additional tracking amount for the mojikumi aki (that is, the part of the glyph's width that is white space) that lies between the punctuation glyph and its preceding glyph. Thus, for example, if in the above example, there is the following sequence of characters and spaces: "character 1—mojikumi aki—character 2" and character 1 is tracked by −2 points, the mojikumi aki is tracked by −1 point, and character 2 is tracked by −1 point, a total tracking of 4 points is obtained. In the alternative implementation, if character 1's glyph width is reduced by −2 points for its grid tracking plus an additional −1 point for the mojikumi aki part of character 2's width, then character 2 is tracked by −1 pt, a total tracking of −4 points is obtained, and the final appearance is the same as discussed in the implementation above.

Figure 4:
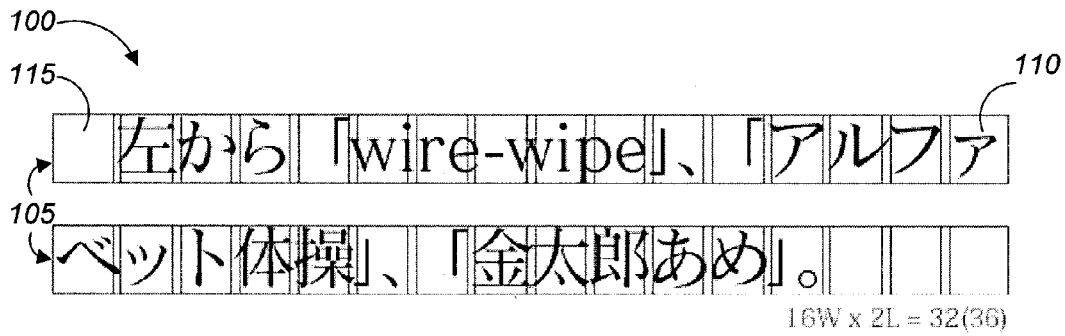
FIG. 4 shows the set of characters of FIG. 1, tracked using tracking in accordance with the invention.

FIG. 4 shows the text of FIG. 1, after tracking has been performed with the process described above. As can be seen in FIG. 4, the problems with standard tracking in DTP systems that were discussed with reference to FIG. 2 above have been eliminated. In the example shown in FIG. 4, the Roman characters remain untracked. The mojikumi aki spacings have been tracked by an amount that is proportional to their respective widths. All tracking is done in absolute points. Roman text is not tracked, non-Roman glyphs are tracked by the user setting of −3 points, and half-width mojikumi aki is tracked by −1.5 points, that is, only half as much as in the traditional grid tracking. As a result, the Roman characters are no longer too close to each other and glyphs that are not a full em wide are tracked an appropriate amount. The mojikumi aki indent (115) at the beginning of the first line of text is tracked and now corresponds to 21 points. As a whole, the text shown in FIG. 4 is tracked in a more aesthetically pleasing way and more readable than the text shown in FIG. 2.

Figure 5:
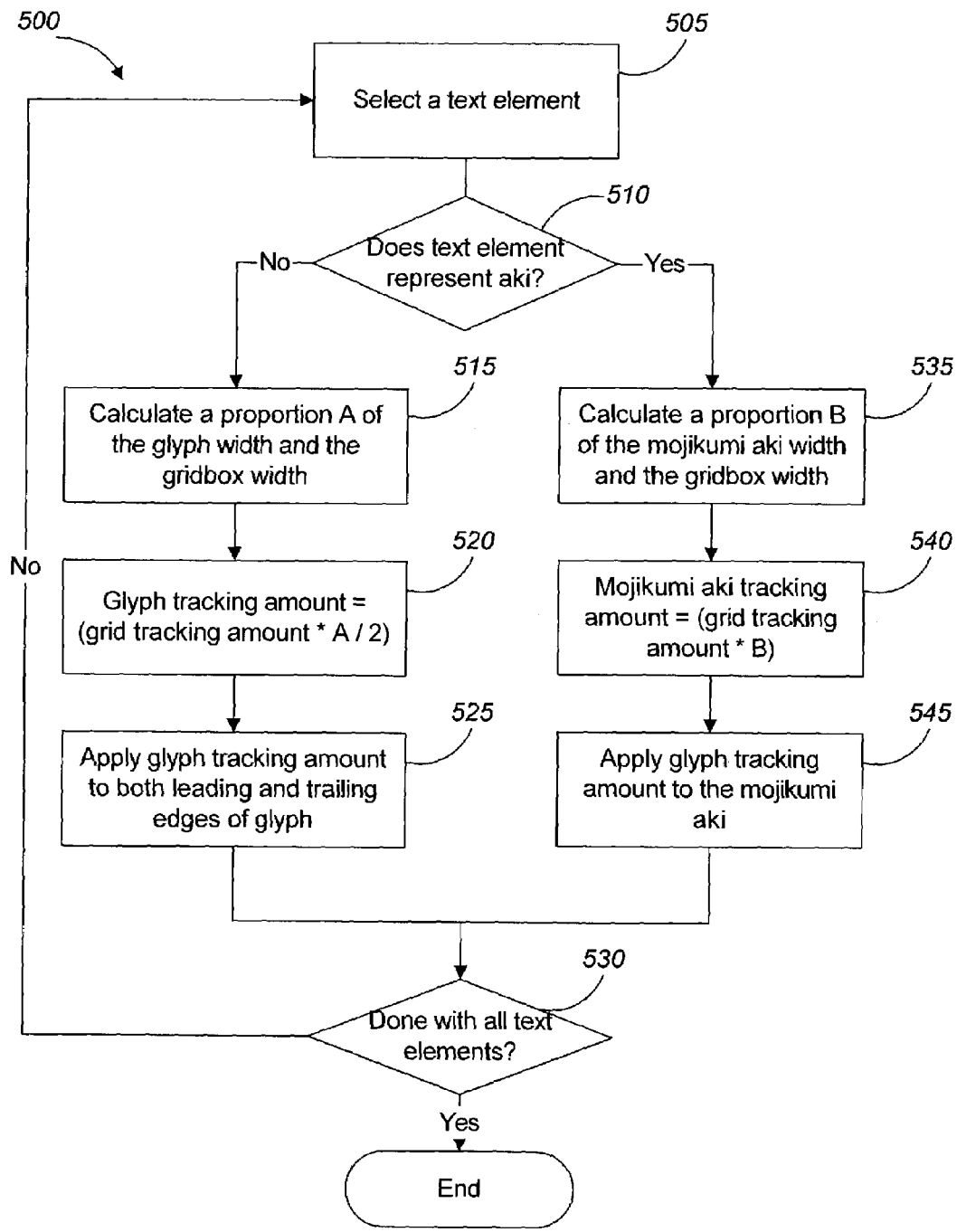
FIG. 5 is a flowchart showing a process for coordinating grid tracking and mojikumi spacing of Japanese text.

Another process for calculating a tracking amount for glyphs containing characters and for mojikumi aki, respectively, will now be discussed with reference to FIGS. 5–7. FIG. 5 shows a flow chart of the process, and FIGS. 6 and 7, respectively, show a line of text before and after the tracking. As can be seen in the upper row of FIG. 6, a character set (600) includes a first character (605), a second character (610) and a third character (615) in a CJK grid. The second character (610) is preceded by a mojikumi aki space (620).

Figure 6:
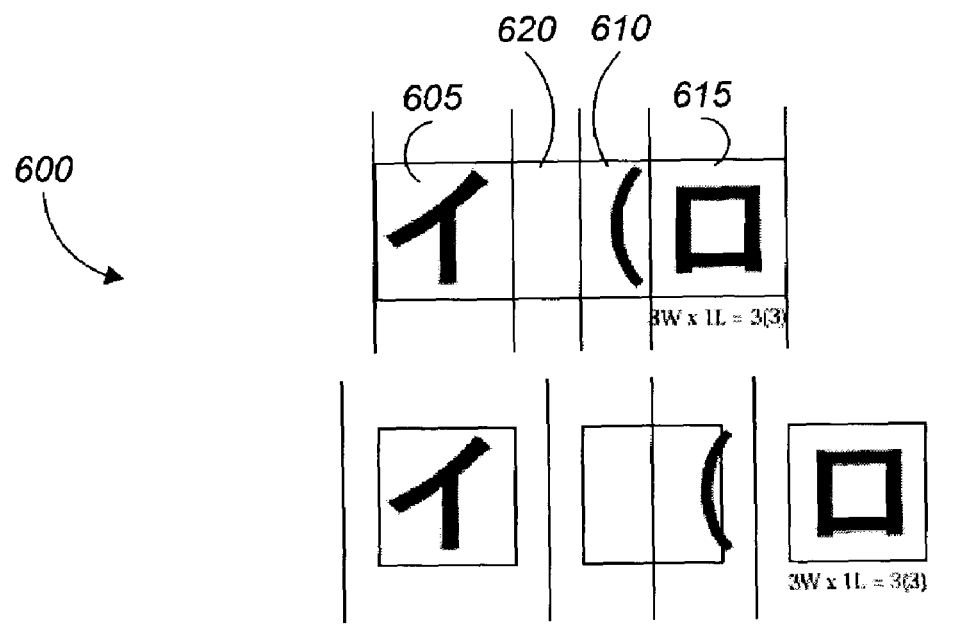
FIG. 6 shows how spacing is added to a first set of characters according to an implementation of the invention.
Figure 7:
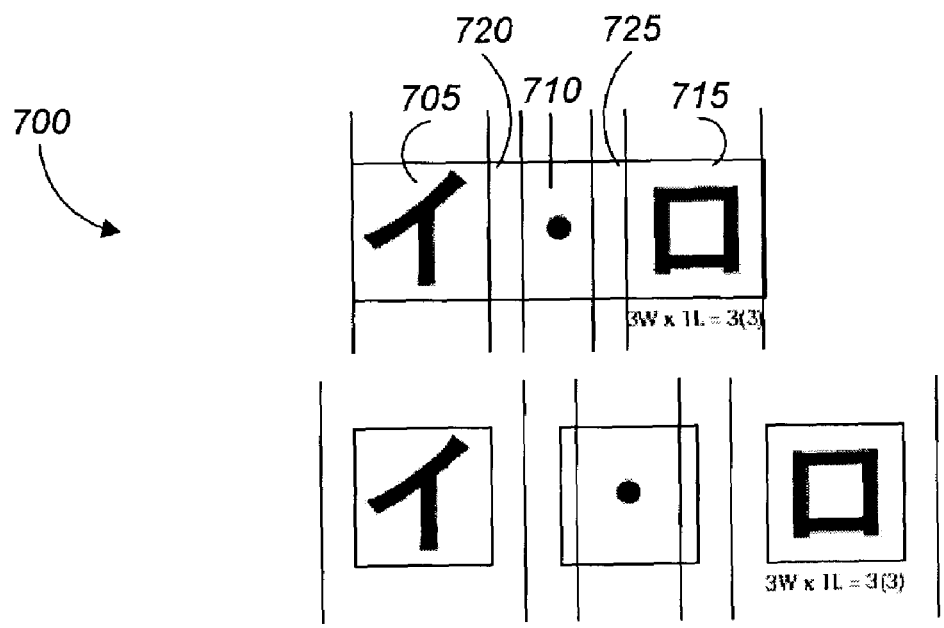
FIG. 7 shows how spacing is added to a second set of characters according to an implementation of the invention.

FIG. 7 is similar to FIG. 6 in that the upper row of FIG. 7 shows, a similar character set (700) that includes a first character (705), a second character (710) and a third character (715) in a CJK grid. The difference is that the second character (710) is both preceded and followed by mojikumi aki spaces (720, 725). Just like in FIG. 6, the absolute width of the gridboxes in the CJK grid is 40 points, which corresponds to the width of the glyphs for the first and third characters (705, 715). The second character (710) is 20 points wide, and the mojikumi aki spaces (720, 725) are 10 points wide each.

As can be seen in FIG. 5, the alternative process (500) for calculating tracking starts with selecting a text element (step 505). The text element can either be a glyph or a mojikumi aki space. The process then determines whether the text element represents mojikumi aki or a glyph for a regular character (step 510). If the text element represents a character glyph, then the process continues by calculating a proportion A of the glyph's width relative to the width of the gridbox (step 515). The absolute width of the gridboxes in the CJK grid shown in FIG. 6 is 40 points, which also corresponds to the width of the glyphs for the first and third characters (605, 615). The second character (610), however, is only 20 points wide. This leads to A=1 for the first and third characters (605, 615) and to A=0.5 for the second character (610). The same relations apply to the first, second, and third characters (705, 710, 715) of FIG. 7.

The process then computes a glyph tracking amount that is equal to the global grid tracking amount, multiplied by the ratio A, and divided by two so that the glyph tracking amount can be applied to both the leading and trailing edges of the glyph (step 525). For the sets of characters shown in FIGS. 6 and 7, the global tracking amount is +20 points, which leads to a glyph tracking amount of +10 points for the first and third characters (605 and 615) of FIG. 6, and a glyph tracking amount of +5 points for the second character (610) of FIG. 6. Again, the same results are obtained for the first, second, and third characters (705, 710, 715) of FIG. 7.

After the glyph tracking amount has been determined, the process applies the glyph tracking amount to both the leading and trailing edges of the glyph (step 525), which ensures a correct location of the character in the gridbox after the tracking amount has been applied. The process then checks if all the text elements have been tracked (step 530). If all the text elements have been tracked the process ends, and if there are still text elements that need to be tracked, the process returns to step 505 and selects a different text element, as described above.

If the process detects in step 510 that the text element represents mojikumi aki, the process calculates a proportion B representing the mojikumi aki width relative to the gridbox width (step 535). As can be seen in FIG. 6, the width of the aki (620) is equal to half the width of the gridbox, and thus B=0.5 for the aki (620). In FIG. 7, the widths of the mojikumi akis (720, 725) are equal to only a fourth of the gridbox width, so here B=0.25.

The process then computes a mojikumi aki tracking amount that is equal to the global grid tracking amount, multiplied by the ratio B (step 540). With a global grid tracking amount of +20 points, this leads to a glyph tracking amount of +10 points for the aki (620) of FIG. 6, and a glyph tracking amount of +5 points for the akis (720, 725) of FIG. 7. The process then applies the mojikumi aki tracking amount to the mojikumi aki (step 545), and continues to step 530 where it determines whether all the glyphs have been processed, as described above. It should be noted that the process described in FIG. 5 ignores the leading edge of characters starting a line and the trailing edge of characters ending a line, respectively, since there already is extra space around these characters and extra tracking is not necessary.

The lower lines of characters in FIG. 6 and FIG. 7, respectively, show the upper sets of characters after tracking has been applied. As can be seen, each character's width has increased to 60 points, with various amounts of tracking added to both sides of characters and to the mojikumi aki, resulting in an aesthetically pleasing appearance. The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results. The principles for the tracking explained herein can be applied to any type of character class that a user defines, and is not limited to Japanese typesetting. Both horizontal and vertical lines can be tracked.

What is claimed is:

1. A computer-implemented method for character composition, comprising:
   receiving a grid defining a layout of one or more lines of grid boxes, each grid box being operable to accommodate one full-width character and the grid having a global tracking amount specified in an absolute unit;
   populating one or more of the grid boxes with a plurality of glyphs representing characters and with associated spaces; and
   tracking the plurality of glyphs and their associated spaces in the one or more lines of grid boxes, where a tracking amount is determined for each of the glyphs as a function of the global tracking amount and a calculated proportion of an em width for the glyph and a tracking amount is determined for each associated space as a function of the global tracking amount and a calculated proportion of an em width for the space.

2. The method of claim 1, wherein:
each grid box is square shaped and has dimensions corresponding to one by one em unit.

3. The method of claim 1, wherein tracking comprises:
adjusting a width of one or more glyphs of the plurality of glyphs in the grid to a desired spacing amount; and
separately adjusting a width on a trailing edge of each of the one or more glyphs and a space associated with each glyph of the one or more glyphs by a fraction of the global, tracking amount after adjusting the width of the one or more glyphs in the grid to a desired spacing amount.

4. The method of claim 3, wherein adjusting the width comprises:
reducing the width of one or more glyphs of the plurality of glyphs to match a standard; and
adding spacing to increase the width of one or more glyphs of the plurality of glyphs based on a context for the one or more glyphs in the one or more lines of grid boxes.

5. The method of claim 3, further comprising:
receiving user input specifying the desired spacing amount associated with one or more glyphs based on a context for the one or more glyphs in the one or more lines of grid boxes.

6. The method of claim 1, wherein tracking comprises:
setting the global tracking amount for the grid;
calculating a proportion of an em width of a glyph's font for one or more glyphs of the plurality of glyphs and one or more mojikumi aki spaces; and
adjusting a spacing for the one or more glyphs as a function of the global tracking amount and a spacing for one or more mojikumi aki spaces associated with the one or more glyphs based on their respective proportion of an em width of the glyph's font.

7. The method of claim 1, wherein tracking comprises:
setting the global tracking amount for the grid;
calculating a proportion of an em width of a glyph's font for one or more glyphs of the plurality of glyphs and one or more inojikumi aki spaces; and
adjusting a spacing by moving the one or more glyphs by an amount that includes a tracking amount for a mojikumi aki space.

8. The method of claim 1, wherein tracking comprises:
calculating a mojikumi tsume space for a glyph of the plurality of glyphs;
subtracting the mojikumi tsume space from an original width of the glyph to obtain a resulting glyph width;
calculating a first proportion corresponding to the resulting glyph width relative to an em unit;
calculating a mojikumi aki space for a pair of adjacent characters containing the glyph and an adjacent glyph;
calculating a second proportion corresponding to a mojikumi aki space width relative to an em unit; p1 adjusting a position for the glyph in the line of grid boxes by an amount obtained by multiplying the global tracking amount and the second proportion, subtracting the result of the multiplication from the mojikumi aki space; and adjusting the resalting glyph width by an amount obtained by multiplying the global tracking amount and the first proportion.

9. The method of claim 1, wherein tracking comprises:
setting the global tracking amount for the grid;
calculating a spacing correction amount as a function of the global tracking amount; and
applying the calculated spacing correction amount to one or more characters and their associated spaces.

10. The method of claim 9, wherein applying the calculated spacing correction amount comprises:
adding the calculated spacing correction amount to both a leading edge and a trailing edge of one or more glyphs representing the characters.

11. The method of claim 9, wherein applying the calculated spacing correction amount comprises:
deleting the calculated spacing correction amount from both a leading edge and a trailing edge of one or more glyphs representing the one or more characters.

12. The method of claim 9, wherein applying the calculated spacing correction amount comprises:
adding the calculated spacing correction amount to a mojikumi aki space.

13. The method of claim 9, wherein applying the calculated spacing correction amount comprises:
deleting the calculated spacing correction amount from a mojikumi ski space.

14. The method of claim 9, wherein calculating a spacing correction amount comprises:
for a character, calculating the spacing correction as the global tracking amount multiplied by half the ratio of the character glyph width and the grid box width; and
for a space, calculating the spacing correction as the global tracking amount multiplied by the ratio of the space width and the grid box width.

15. The method of claim 1, wherein receiving a grid comprises:
receiving a grid defining one or more horizontal lines of characters.

16. The method of claim 1, wherein receiving a grid comprises:
receiving a grid defining one or more vertical lines of characters.

17. The method claim 1, wherein receiving a grid comprises:
receiving a Chinese-Japanese-Korean grid.

18. The method of claim 1, wherein:
tracking is not applied to characters in a Roman font.

19. A computer program product, tangibly stored on a computer-readable medium, for coordinating grid tracking and mojikumi spacing in character composition, comprising instructions operable to cause a programmable processor to:
receive a grid defining a layout of one or more lines of grid boxes, each grid box being operable to accommodate one full-width character and the grid having a global tracking amount specified in an absolute unit;
populate one or more of the grid boxes with a plurality of glyphs representing characters and with associated spaces; and
track the plurality of glyphs and their associated spaces in the one or more lines of grid boxes, where a tracking amount is determined for each of the glyphs as a function of the global tracking amount and a calculated proportion of an em width for the glyph and a tracking amount is determined for each associated space as a function of the global tracking amount and a calculated proportion of an em width for the space.

20. The computer program product of claim 19, wherein: each grid box is square shaped and has dimensions corresponding to one by one em unit.

21. The computer program product of claim 19, wherein the instructions to track comprise instructions to:
adjust a width of one or more glyphs of the plurality of glyphs in the grid to a desired spacing amount; and
separately adjust a width on a railing edge of each of the one or more glyphs and a space associated with each glyph of the one or more glyphs by a fraction of to global tracking amount after adjusting the width of the one or more glyphs in the grid to a desired spacing amount.

22. The computer program product of claim 21, wherein the instructions to adjust the width comprise instructions to:
reduce the width of one or more glyphs of the plurality of glyphs to match a standard; and
add spacing to increase to width of one or more glyphs of the plurality of glyphs based on a context for the one or more glyphs in the one or more lines of grid boxes.

23. The computer program product of claim 21, further comprising instructions to:
receive user input specifying the desired spacing amount associated with one or more glyphs based on a context for the one or more glyphs in the one or more lines of grid boxes.

24. The computer program product of claim 19, wherein the instructions operable to cause a programmable processor to track comprise instructions to:
set the global tracking amount for the grid;
calculate a proportion of an em width of a glyph's font for one or more glyphs of the plurality of glyphs and one or more mojikumi aki spaces; and
adjust a spacing for the one or more glyphs as a function of the global tracking amount and a spacing for one or more mojikumi aki spaces associated with the one or more glyphs based on their respective proportion of an em width of the glyph's font.

25. The computer program product of claim 19, wherein the instructions operable to cause a programmable processor to track comprise instructions to:
set the global tracking amount for the grid;
calculate a proportion of an em width of a glyph's font for one or more glyphs of the plurality of glyphs and one or more mojikumi aki spaces; and
adjust a spacing by moving the one or more glyphs by an amount that includes a tracking amount for a mojikumi aki space.

26. The computer program product of claim 19, wherein the instructions operable to cause a programmable processor to track comprise instructions to:
calculate a mojikumi tsume space for a glyph of the plurality of glyphs;
subtract the mojikumi tsume space from an original width of the glyph to obtain a resulting glyph width;
calculate a first proportion corresponding to the resulting glyph width relative to an em unit;
calculate a mojikumi aki space for a pair of adjacent characters containing the glyph and an adjacent glyph;
calculate a second proportion corresponding to a mojikumi aki space width relative to an em unit;
adjust a position for the glyph in the line of grid boxes by an amount obtained by multiplying the global tracking amount and the second proportion, subtracting the result of the multiplication from the mojikumi aki space; and
adjust the resulting glyph width by an amount obtained by multiplying the global tracking amount and the first proportion.

27. The computer program product of claim 19, wherein the instructions operable to cause a programmable processor to track comprise instructions to:
set the global tracking amount for the grid;
calculate a spacing correction amount as a function of the global tracking amount; and
apply the calculated spacing correction amount to one or more characters and their associated spaces.

28. The computer program product of claim 27, wherein the instructions to apply the calculated spacing correction amount comprise instructions to:
add the calculated spacing correction amount to both a leading edge and a trailing edge of one or more glyphs representing the one or more characters.

29. The computer program product of claim 27, wherein the instructions to apply the calculated spacing correction amount comprise instructions to:
delete the calculated spacing correction amount from both a leading edge and a trailing edge of one or more glyphs representing the one or more characters.

30. The computer program product of claim 27, wherein the instructions to apply the calculated spacing correction amount comprise instructions to:
add the calculated spacing correction amount to a mojikumi aki space.

31. The computer program product of claim 27, wherein the instructions to apply the calculated spacing correction amount comprise instructions to:
delete the calculated spacing correction amount from a mojikumi aki space.

32. The computer program product of claim 27, wherein the instructions to calculate a spacing correction amount comprise instructions to:
for a character, calculate the spacing correction as the global tracking amount multiplied by half the ratio of the character glyph width and the grid box width; and
for a space, calculate the spacing correction as the global tracking amount multiplied by the ratio of the space width and the grid box width.

33. The computer program product of claim 19, wherein the instructions operable to cause a programmable processor to receive a grid comprise instructions to:
receive a gild defining one or more horizontal lines of characters.

34. The computer program product of claim 19, wherein the instructions operable to cause a programmable processor to receive a grid comprise instructions to:
receive a grid defining one or more vertical lines of characters.

35. The computer program product of claim 19, wherein the instructions operable to cause a programmable processor to receive a grid comprise instructions to:
receive a Chinese-Japanese-Korean grid.

36. The computer program product of claim 19, wherein the instructions operable to cause a programmable processor to track comprise instructions to:
apply no tracking to characters in a Roman font.

* * * * *

UNITED STATES PATENT AND TRADEMARK OFFICE
CERTIFICATE OF CORRECTION

PATENT NO. : 7,123,261 B2
APPLICATION NO. : 10/390991
DATED : October 17, 2006
INVENTOR(S) : Nathaniel M. McCully It is certified that error appears in the above-identified patent and that said Letters Patent is hereby corrected as shown below:

Column 9, line 16, after "global", delete the comma;
  line 46, delete "inojikumi" and replace with --mojikumi--;
  line 60, delete "pl";
Column 10, line 1, delete "resalting" and replace with --resulting--;
  line 27, delete "ski" and replace with --aki--;
Column 11, line 8, delete "railing" and replace with --trailing--;
  line 10, delete "to" and replace with --the--;
  line 18, delete the second occurrence of "to" and replace with --the--;
Column 12, line 46, delete "gild" and replace with --grid--.

Signed and Sealed this

Thirteenth Day of February, 2007

JON W. DUDAS
*Director of the United States Patent and Trademark Office*